United States Patent Office 2,900,276
Patented Aug. 18, 1959

2,900,276

CERMET COMPOSITION AND METHOD OF COATING THEREWITH

John V. Long, San Diego, and John V. Furth, La Jolla, Calif., assignors to Solar Aircraft Company, San Diego, Calif., a corporation of California No Drawing. Application May 31, 1955
Serial No. 512,315

27 Claims. (Cl. 117—70)

This invention relates generally to protective coatings, and more specifically is directed to ceramic aluminum coatings for protection of metals and ceramics, to novel compositions, frits and slips for use in making these coatings, and to methods for producing such coating compounds and applying them to surfaces to be coated.

Ceramic coating of metals and metallic alloys as by porcelain enameling has long been known and practiced for corrosion and oxidation protection of the coated metal. The plating or cladding of a metal with aluminum, or of glass or other ceramic with aluminum, also is well established in the art.

While ceramic coatings have proven highly effective in protecting metals in certain environments, and aluminum coatings also have many useful applications, there exists an area between these known arts in which for various reasons neither has proven satisfactory. Thus, ceramic coatings provide good refractoriness and both chemical and physical stability at high temperatures, but they generally are undesirably frangible and have poor resistance to thermal and mechanical shock. Aluminum coatings, on the other hand, have good ductility and strength and are resistant to thermal and mechanical shock, but at high temperatures the ability of many of these coatings to resist oxidation and corrosion is markedly reduced. Also it is important in prior art processes that the work piece be carefully processed to assure that it is completely clean and free of loose oxides or other foreign matter prior to application of the coating. Accordingly, neither of these known prior coatings is wholly satisfactory for use in applications requiring that the coating have good mechanical strength and chemical and physical stability when subjected to high or rapidly changing temperature and vibration or other mechanical shock, and that it be easily and inexpensively applied.

It is the principal purpose of the present invention to provide methods and means for forming protective coatings which avoid the above-discussed shortcomings of aluminum and ceramic coatings and fulfill the desired requirements outlined above, thus providing unique properties extremely useful in filling the gap between prior ceramic and aluminum coatings, also useful in overlapping into both these prior arts. In accordance with the invention, this objective is attained by use of protective coatings comprising both ceramic and metallic components, these being selected and combined so as to retain, in the finished coatings, the more desirable properties of each of the components.

Thus, in our invention we provide coatings having ceramic components which contribute refractoriness, high temperature strength and both chemical and physical stability at high temperatures; and aluminum components which give the coatings ductility and high resistance to thermal and mechanical shock. Further, our invention provides methods, means and compositions for use in achieving these desirable coatings.

Briefly described, the invention provides coating methods and materials combining ceramics with powdered aluminum or aluminum alloy, these materials being applied to a wide class of metals, metallic alloys, and ceramics including glasses, and then fired to produce highly protective coatings on such bases. Specific steps of preparation, application and use of our novel coatings are hereinafter disclosed in detail.

Various combinations of metals and ceramics in other applications have heretofore been proposed and have come to be known as "cermets." Accordingly, the ceramic aluminum coatings of the invention will for purposes of convenience be hereinafter referred to as cermet coatings.

It is accordingly a primary object of the invention to provide new and improved methods, means and compositions for forming highly protective aluminum-ceramic coatings on metal, metallic alloy and/or ceramic bases.

Another major object is the provision of novel protective coatings comprising ceramics and aluminum or its alloys. A further important object is the provision of methods and materials for producing inexpensive, easily applied cermet coatings which fire at comparatively low temperatures and give protection in medium and high temperature ranges for long periods of time.

Yet another object is the provision of such cermets which may be applied in either powder or slip form, by spraying or dipping, to many different bases ranging from ceramics such as glass, through copper, mild steels, stainless steels, and the super alloys such as N–155, Inconel, and other high chromium-nickel based alloys.

Still another object is the provision of novel coating processes which do not require controlled atmospheres and are equally adaptable to gas-fired furnaces and electric furnaces.

A further important object is to provide novel coatings which serve as excellent ground coats for subsequently applied ceramic top coats, to thus make possible the ceramic coating of metals and alloys which cannot otherwise be ceramic coated.

Another object is the provision of new and improved coatings applicable to a range of work pieces of thickness from about .001" to massive castings inches thick.

Still another object is provision of methods and materials for forming coatings characterized by high thermal conductivity, and by high resistance to thermal shock, mild acid attack, mechanical shock, corrosive attack, impingement erosion, and other deleterious media.

These and other important objects, features and advantages of the invention will become more fully apparent from the following detailed description and the appended claims.

Cermet coating in accordance with the invention may be effected in very simple manner by applying to the metal or ceramic base to be coated a thoroughly mixed combination of powdered aluminum or aluminum alloy and a boride, preferably boron oxide ($B_2O_3$), and firing the surface thus coated at least to the fusion point of the aluminum or aluminum alloys to produce an article protected by a firmly bonded layer of the resultant cermet.

While this basic process is useful to provide protective coatings, boron oxide alone is difficult to work with, and the dry mixture of boron oxide and aluminum is limited in its use because it is difficult to cover a part with such a mixture and cause the powder to adhere prior to the firing cycle.

We have found that these difficulties may be entirely avoided and optimum coatings obtained by use of an alkaline earth oxide, preferably barium oxide, which will permit the dry ceramic and metallic powders to be mixed into a water slip without the usual exothermic reaction which occurs when boron oxide and water are mixed, and which inhibits the oxidation usually associated with mixture of aluminum powder in water. We have further improved our process by providing frits which include the boron and alkaline earth oxides and thus are representative of the ceramic phase of our novel coatings, and which may be easily combined into a liquid slip with the metallic phase to thus provide an easily workable and extremely useful means of utilizing our invention to achieve the desired coatings.

A preferred ceramic phase of our invention comprises a fritted compound of barium oxide and boron oxide preferably in a ratio of $BaO:3B_2O_3$, this ratio being a critical factor to achievement of optimum results in coating. Preferably, aluminum fluoride is included in the frit, in a ratio of about $BaO:3B_2O_3: 1/2AlF_3$, in order to lower ratio of about $BaO:3B_2O_3:1/2AlF_3$, in order to lower the melting point and because the fluoride is a good flux for aluminum. It is to be understood, however, that while aluminum fluoride is a very beneficial addition to the frit, its use and the proportions in which it is added are not critical.

The frit preferably is prepared in steps of smelting 197 parts of barium carbonate ($BaCO_3$), 372 parts of boric acid ($H_3BO_3$) and 42 parts of aluminum fluoride ($AlF_3$) at a temperature of approximately 2200° F., until the melt is clear and free of bubbles, about 30 to 45 minutes. Barium carbonate and boric acid are used because they are readily available and relatively inexpensive as compared with barium oxide and boron oxide. The carbon dioxide ($CO_2$) in the barium carbonate and the water ($H_2O$) in the boric acid are released during the smelting cycle.

The smelt then is fritted by any standard method, such as by pouring into water or rolling between cooled rollers. The resultant frit is dry milled preferably to a fineness of about −200 mesh.

This frit then is mixed with aluminum powder, preferably of about −200 mesh size, a suspension agent such as ball type clay, and water to form a slip. If the slip is to be sprayed on the part to be coated, we have found that a mixture of 30 parts by weight of frit, 65 parts by weight of aluminum powder, 5 parts by weight of clay, and 45–50 parts by weight of water is preferred. If the work piece is to be dipped, we use an added 5 parts by weight of clay. Mixing is not critical and may be accomplished manually or in any mechanical mixer, the object being to obtain a good dispersion of the various ingredients throughout the batch or slip.

During this mixing operation, no exothermic reaction between the water and the boron oxide of the frit is experienced because the boron oxide when combined with barium oxide in the frit is relatively insoluble in water and has very different properties from boron oxide alone in water.

While in general we prefer to utilize comparatively pure aluminum powder in our coatings, we have achieved good success with alloys of aluminum and silicon, aluminum and copper, and others of the aluminum alloys. Other metals in powder form such as iron, chromium, nickel, etc., may be added in small amounts to develop a composite metallic mixture that is not available as an alloy. For example, if iron is added, a solid solution or intermetallic such as $FeAl_3$ may be formed which has a high melting point and should provide improved high temperature protection. Also, we have found that the barium oxide of the frit, or any part of it, may be replaced with an equal amount of calcium oxide (CaO).

It should be understood that for specific protective qualities, in some cases the ceramic or glassy phase will be accentuated, while for other specific applications, it is desirable to increase the metallic phase. Therefore, the useful ceramic range is from about 20 to 70 parts by weight, while a satisfactory range of metal powder is from 70 to 20 parts by weight.

We have found that for general protection at ambient temperatures, our coatings are particularly satisfactory when the slip is compounded on the low metallic side, that is, when up to 70 parts of frit are combined with a minimum of 20 parts of aluminum or aluminum alloy powder. These "glassy" coatings are especially useful when an acid condition will be encountered in service, such, for example, as when the coated part will be used in citrus fruit processing plants.

However, as service temperatures increase, we have found that best results are obtained with higher metallic content in the coating. For example, a slip composed of say 20 parts of frit and 70 parts of metal powder will provide a coating more satisfactory when it is to protect mild steel in service temperatures in the range of 1500° F., for long periods of time. Tests have been run for up to 1200 hours at 1500° F. with the last-mentioned coating, with no deleterious effects to the mild steel base.

A highly desirable advantage of the invention resides in the fact that in either spraying or dipping, thickness of the bisque is not critical. A bisque of from half a mil to 25 mils is satisfactory, although superior results are generally obtained with a coating of from 3 to 15 mils in thickness. Prior to firing, the sprayed or dipped part preferably is dried either at atmospheric temperatures or in a forced temperature up to 300° F. While it is possible to fire the wet bisque, there is danger that it may spall from the work piece.

When the bisque is dry, the part is fired at a temperature sufficiently high that the work piece will attain a minimum surface temperature of approximately 1350° F. The maximum temperature of the furnace is not critical, and we have fired successfully from 1350° to 2200° F., in times of from 45 seconds for thin pieces at high temperatures to one hour or more for thick parts at lower temperatures.

During firing, the coated surface is heated at least to the fusion point of the aluminum or aluminum alloy powder, and most if not all the metal powder grains melt and combine with other grains to form what appears to be a continuous network of aluminum interspersed with ceramic securely bonded to the underlying basis metal or ceramic. Other of the metal grains may not melt during the firing cycle and so remain as individual grains in the finished coating.

While it is difficult to analyze the ceramic phase of the finished coating it appears to be substantially the same as the frit from which it is derived, except for the addition of oxides absorbed during firing. The frit acts to flux oxides from the base metal and aluminum powder, and to "plug up" the porosity inherent in many prior aluminum and aluminum alloy coatings. It should be noted that the fluxing action of the frit is equally effective in cleaning and protecting both the basis metal and the aluminum powder. This double fluxing action is very important, since if the base is not thoroughly fluxed the coat will not adhere, and if the aluminum is poorly fluxed it may be subject to oxidation and to loss of its metallic qualities. Boric anhydride has this necessary and apparently unique property of fluxing both the aluminum and the base metal and, as noted above, it is particularly effective in accomplishing this purpose when tied up with alkaline earth oxide in the frit so it does not react with the water of the slip or with the aluminum during or subsequent to firing. If a ceramic or glass is being coated, fluxing action of the aluminum oxides, as well as slight fluxing of the base material, occurs. Fluxing of the base material consists of slightly softening the material to assure that an intimate bond with the coating will be obtained.

A further highly desirable advantage of our coatings is that there is no need to "cure" or "fire out" the coating, which shows no tendency to flow or run but bonds strongly to the adjacent base. This is of particular advantage where thick coatings are desired, because no run-off during firing is experienced.

Still another advantage resides in the fact that highly satisfactory firing may be accomplished in a gas-fired furnace with no necessity for controlling the atmosphere. An electric furnace with an uncontrolled atmosphere also is satisfactory, although we prefer the gas-fired furnace which is less expensive and considered a standard facility in general enameling plants. Many prior art ceramic coatings and metallic cladding processes depend on carefully controlled atmospheres to achieve any degree of success and to prevent undesirable variation in coating characteristics from piece to piece. The coating process of the invention therefore provides substantial economies in firing equipment and its operating costs, with no sacrifice in quality of the coatings obtained.

Following the firing cycle, the part may be cooled in a number of ways. For example it may be removed from the furnace and merely allowed to cool normally; or, it may be cooled more rapidly by forced air cooling or by quenching in oil or water. The oil quench is particularly useful for steel parts, like 4130 steel, which must be quenched and tempered to a desired hardness.

As noted, the cermet coatings of the invention provide excellent ground coats for subsequently applied porcelain enamel or other ceramic top coats, and also may be used as a ground coat for a subsequently applied metal coating. It also is possible to mold and fire the cermet mixtures of our invention independently of a base, to thus obtain molded articles of cermet constituency throughout.

As will be obvious to those skilled in the art, desired color may be imparted to our cermet coatings by including portions of cobalt oxide for blue, vanadium pentoxide for yellow, etc.

As noted above, the coatings of the invention are characterized by high resistance to thermal shock, and may be removed from a furnace temperature of say 1600° F. and plunged into cold water or oil with no deleterious effects. These cermet coatings also have high resistance to mechanical shock, far superior to any ceramic coatings of our knowledge, and comparable with all-metal coatings.

From the above, it will be appreciated that we have provided new and improved means and methods for producing highly useful ceramic-aluminum protective coatings on a wide range of bases from glass to the super alloys. The cermet coatings of the invention bridge the gap between ceramic coatings and aluminum coatings and are characterized by the more desirable properties of each of those two prior coatings.

The term "aluminum" when used in the claims means a metal selected from the group consisting of aluminum and aluminum base alloys.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

Therefore, what we claim and desire to have protected by Letters Patent is:

1. A method of providing a surface with an aluminum-ceramic cermet coating comprising the steps of: applying to the surface to be coated a slip including a liquid vehicle, 20 to 70 parts by weight aluminum in particle form, and 70 to 20 parts by weight of a heat-reacted alkaline earth borate frit consisting essentially of a major portion of boron oxide and at least one alkaline earth oxide in a quantity at least sufficient to render said frit relatively insoluble in water; and firing said surface to be coated to at least the fusion temperature of the aluminum to form a cermet coating on said surface.

2. A method of providing a metal surface with a cermet coating as defined in claim 1, wherein said frit comprises boron oxide and alkaline earth oxide in a molar ratio of about 3:1 respectively.

3. A method of providing a metal surface with a cermet coating as defined in claim 2, wherein said alkaline earth oxide consists of at least one material selected from the group consisting of barium oxide and calcium oxide.

4. A method of providing a metal surface with a cermet coating as defined in claim 2, wherein said frit further comprises up to ½ mol of aluminum fluoride per mol of alkaline earth oxide.

5. A method of providing a metal surface with a cermet coating as defined in claim 2, wherein said surface is fired to a minimum temperature of approximately 1350° F. in said last-recited step.

6. A method of providing a metal surface with a cermet coating as defined in claim 5, wherein said firing step is carried out in air.

7. A method of providing a metal surface with a cermet coating as defined in claim 5, and further comprising the step of applying a ceramic coating over said cermet coating.

8. A method of providing a metal surface with a cermet coating as defined in claim 2 wherein said slip includes a suspension agent.

9. A method of providing a metal surface with a cermet coating as defined in claim 8 wherein said slip includes 5 to 10 parts by weight of a ball type clay suspension agent.

10. A method of providing a metal surface with a cermet coating as defined in claim 1, wherein said frit consists essentially of said boron oxide and alkaline earth oxide as therein defined plus a minor amount of aluminum fluoride.

11. An alkaline earth borate frit which is a heat-reacted and fritted product of a mixture consisting essentially of a major portion of boron oxide, at least one alkaline earth oxide in a quantity at least sufficient to render said frit relatively insoluble in water and a minor amount of aluminum fluoride.

12. An alkaline earth borate frit as defined in claim 11, wherein said heat-reacted and fritted mixture consists of said boron oxide, alkaline earth oxide and aluminum fluoride in a molar ratio of about 3:1:½ respectively.

13. An alkaline earth borate frit which is a heat-reacted and fritted product of a mixture comprising as essential ingredients boron oxide, at least one material selected from the group consisting of barium oxide and calcium oxide, and aluminum fluoride, in a molar ratio of about 3:1:½ respectively.

14. A cermet coating composition comprising: 20 to 70 parts by weight of aluminum in particle form and 70 to 20 parts by weight of a heat-reacted alkaline earth borate frit consisting essentially of a major portion of boron oxide and at least one alkaline earth oxide in a quantity at least sufficient to render said frit relatively insoluble in water.

15. A cermet coating composition as defined in claim 14, wherein said frit comprises boron oxide and alkaline earth oxide in a molar ratio of about 3:1 respectively.

16. A cermet coating composition as defined in claim 15, wherein said alkaline earth oxide comprises at least one material selected from the group consisting of barium oxide and calcium oxide.

17. A cermet coating composition as defined in claim 15, wherein said frit further comprises up to ½ mol of aluminum fluoride per mol of alkaline earth oxide.

18. A cermet coating composition as defined in claim 15 further comprising 5 to 10 parts by weight of a ball type clay.

19. A cermet coating slip comprising: a cermet coating composition as defined in claim 15 suspended in a liquid vehicle, with a suspension agent.

20. A slip as defined in claim 19, wherein said suspension agent is 5 to 10 parts by weight of a ball type clay.

21. A cermet coating slip as defined in claim 19 wherein said liquid vehicle is water.

22. A cermet coating composition as defined in claim 14, wherein said frit consists essentially of boron oxide and alkaline earth oxide as therein described and a minor amount of aluminum fluoride.

23. A cermet coating slip comprising: a cermet coating composition as defined in claim 14 suspended in a liquid vehicle with a suspension agent.

24. A cermet coating composition comprising: 20 to 70 parts by weight of aluminum in particle form and 70 to 20 parts by weight of a frit which is a heat-reacted and fritted product of a mixture comprising as essential ingredients boron oxide and at least one material selected from the group consisting of barium oxide and calcium oxide and aluminum fluoride, in a molar ratio of $3:1:\frac{1}{2}$ respectively.

25. As an article of manufacture, a body including a surface having bonded thereto an aluminum-ceramic cermet coating including approximately 20 to 70 parts by weight of an aluminum phase interspersed with approximately 70 to 20 parts by weight of a ceramic phase which is composed of a heat-reacted fritted alkaline earth borate consisting essentially of a major portion of boron oxide and at least one alkaline earth oxide in a quantity at least sufficient to render said frit relatively insoluble in water.

26. As an article of manufacture, a metal body including a surface having bonded thereto an aluminum-ceramic cermet coating as defined in claim 25 wherein said ceramic phase is composed of said heat-reacted borate which comprises as essential ingredients thereof boron oxide, alkaline earth oxide, and aluminum fluoride in a molar ratio of about $3:1:\frac{1}{2}$ respectively.

27. As an article of manufacture, a metal body including a surface having bonded thereto an aluminum-ceramic cermet coating as defined in claim 26 in which said aluminum phase comprises a substantially continuous network of aluminum interspersed with said ceramic, with some grains of aluminum present in particle form within said ceramic phase.

References Cited in the file of this patent

UNITED STATES PATENTS

| | | |
|---|---|---|
| 1,856,303 | White | May 3, 1932 |
| 2,396,856 | King | Mar. 19, 1946 |
| 2,403,706 | Bryant | July 9, 1946 |
| 2,599,185 | Lepp | June 3, 1952 |
| 2,729,880 | Miller | Jan. 10, 1956 |

FOREIGN PATENTS

| | | |
|---|---|---|
| 656,503 | Great Britain | Aug. 22, 1951 |
| 712,082 | Great Britain | July 14, 1954 |
| 715,528 | Great Britain | Sept. 15, 1954 |

OTHER REFERENCES

Metal Finishing, vol. 50, No. 10, Oct. 1952, pg. 61, 117–129.